United States Patent
Lumbab et al.

(10) Patent No.: US 9,656,761 B2
(45) Date of Patent: May 23, 2017

(54) LIPSKIN FOR A NACELLE AND METHODS OF MAKING THE SAME

(71) Applicant: The Boeing Company, Seal Beach, CA (US)

(72) Inventors: Alex C. Lumbab, Bothell, WA (US); Bradley Scott Leisten, Snohomish, WA (US)

(73) Assignee: The Boeing Company, Chicago, IL (US)

(*) Notice: Subject to any disclaimer, the term of this patent is extended or adjusted under 35 U.S.C. 154(b) by 415 days.

(21) Appl. No.: 14/266,128

(22) Filed: Apr. 30, 2014

(65) Prior Publication Data

US 2015/0314850 A1 Nov. 5, 2015

(51) Int. Cl.
| F01D 25/24 | (2006.01) |
| B64D 33/02 | (2006.01) |
| B64C 7/02 | (2006.01) |
| F02C 7/04 | (2006.01) |

(52) U.S. Cl.
CPC ............ B64D 33/02 (2013.01); B64C 7/02 (2013.01); F02C 7/04 (2013.01); *B64D 2033/0206* (2013.01); *B64D 2033/0286* (2013.01); *F05D 2230/239* (2013.01); *F05D 2300/173* (2013.01); *Y02T 50/671* (2013.01); *Y10T 29/49828* (2015.01); *Y10T 29/49909* (2015.01)

(58) Field of Classification Search
CPC ............ B64C 7/02; B64D 2033/0206; B64D 2033/0286; B64D 33/02; F02C 7/04; F05D 2230/239; F05D 2300/173; Y10T 29/49828; Y10T 29/49909
See application file for complete search history.

(56) References Cited

U.S. PATENT DOCUMENTS

| 3,806,928 | A | | 4/1974 | Costanza |
| 4,539,244 | A | | 9/1985 | Beggs et al. |
| 4,738,416 | A | | 4/1988 | Birbragher |
| 5,041,323 | A | | 8/1991 | Rose et al. |
| 5,156,362 | A | * | 10/1992 | Leon ............... B64C 23/06 244/130 |

(Continued)

FOREIGN PATENT DOCUMENTS

| EP | 0911803 A2 | 4/1999 |
| EP | 2241504 A2 | 10/2010 |

(Continued)

OTHER PUBLICATIONS

GB Search and Examination Report, dated May 3, 2016, for copending GB patent application No. GB1506925.5 (6 pages).

(Continued)

*Primary Examiner* — Jesse Bogue
(74) *Attorney, Agent, or Firm* — Armstrong Teasdale LLP (57) ABSTRACT

A lipskin for a nacelle includes a generally annular first lipskin segment that extends generally upstream from a first lipskin edge to a forward edge. The forward edge is proximate to a hilite of the nacelle. The lipskin also includes a generally annular second lipskin segment that extends generally downstream from the forward edge to a second lipskin edge. The second lipskin segment is oriented generally concentrically about the first lipskin segment. The first lipskin segment and the second lipskin segment are coupled together at the forward edge.

20 Claims, 4 Drawing Sheets

(56) References Cited

U.S. PATENT DOCUMENTS

| | | |
|---|---|---|
| 5,344,280 A | 9/1994 | Langenbrunner et al. |
| 5,653,836 A | 8/1997 | Mnich et al. |
| 6,203,656 B1 | 3/2001 | Syed |
| 6,268,038 B1 | 7/2001 | Porte et al. |
| 6,371,242 B1 | 4/2002 | Wilson et al. |
| 6,536,556 B2 | 3/2003 | Porte et al. |
| 6,607,625 B2 | 8/2003 | Andre et al. |
| 6,615,950 B2 | 9/2003 | Porte et al. |
| 6,688,558 B2 | 2/2004 | Breer et al. |
| 6,749,704 B2 | 6/2004 | Boussu et al. |
| 6,755,280 B2 | 6/2004 | Porte et al. |
| 6,761,245 B2 | 7/2004 | Porte |
| 6,772,857 B2 | 8/2004 | Porte et al. |
| 6,820,337 B2 | 11/2004 | Buge et al. |
| 6,840,349 B2 | 1/2005 | Andre et al. |
| 6,896,099 B2 | 5/2005 | Porte et al. |
| 6,923,931 B2 | 8/2005 | Dublineau et al. |
| 7,257,894 B2 | 8/2007 | Buge et al. |
| 7,338,696 B2 | 3/2008 | Rambaud et al. |
| 7,484,592 B2 | 2/2009 | Porte et al. |
| 7,503,425 B2 | 3/2009 | Strunk |
| 7,780,117 B2 | 8/2010 | Botura et al. |
| 7,790,082 B2 | 9/2010 | Buge et al. |
| 7,857,093 B2 | 12/2010 | Sternberger et al. |
| 7,921,966 B2 | 4/2011 | Chiou et al. |
| 7,923,668 B2 | 4/2011 | Layland et al. |
| 8,067,097 B2 | 11/2011 | Mueller |
| 8,181,900 B2 | 5/2012 | Chene et al. |
| 8,240,982 B2 | 8/2012 | Vauchel |
| 8,740,137 B2 * | 6/2014 | Vauchel ................ B64D 29/08 244/53 B |
| 8,863,893 B2 | 10/2014 | Sternberger et al. |
| 8,899,512 B2 | 12/2014 | Vauchel et al. |
| 8,919,494 B2 | 12/2014 | Burkett et al. |
| 9,027,884 B2 | 5/2015 | Valleroy et al. |
| 2002/0157764 A1 | 10/2002 | Andre et al. |
| 2003/0021976 A1 | 1/2003 | Dublineau et al. |
| 2003/0042657 A1 | 3/2003 | Dublineau et al. |
| 2004/0023026 A1 | 2/2004 | Rambaud et al. |
| 2004/0148891 A1 | 8/2004 | Porte et al. |
| 2004/0227276 A1 | 11/2004 | Buge et al. |
| 2004/0237502 A1 | 12/2004 | Moe et al. |
| 2005/0006529 A1 * | 1/2005 | Moe ....................... B64D 15/12 244/134 D |
| 2005/0081992 A1 | 4/2005 | Buge et al. |
| 2005/0082112 A1 | 4/2005 | Harrison |
| 2005/0254955 A1 * | 11/2005 | Helder ................ B23K 20/122 416/233 |
| 2006/0145001 A1 | 7/2006 | Smith |
| 2006/0219475 A1 * | 10/2006 | Olsen ..................... B64D 33/02 181/214 |
| 2007/0210073 A1 | 9/2007 | Hubert et al. |
| 2008/0179448 A1 | 7/2008 | Layland et al. |
| 2008/0248278 A1 | 10/2008 | Fisher et al. |
| 2009/0140104 A1 * | 6/2009 | Surply .................. B64D 33/02 244/53 B |
| 2010/0084507 A1 * | 4/2010 | Vauchel ................ B64D 29/08 244/1 N |
| 2010/0176250 A1 | 7/2010 | Porte |
| 2010/0199629 A1 | 8/2010 | Chene et al. |
| 2010/0252689 A1 * | 10/2010 | Vauchel ................ B64D 29/06 244/53 B |
| 2010/0260602 A1 | 10/2010 | Binks et al. |
| 2011/0142615 A1 | 6/2011 | Riou et al. |
| 2011/0147534 A1 | 6/2011 | Chelin et al. |
| 2011/0162429 A1 * | 7/2011 | Leacock ................ B21D 25/02 72/296 |
| 2011/0248117 A1 | 10/2011 | Boock et al. |
| 2013/0126265 A1 | 5/2013 | Sternberger et al. |
| 2013/0283821 A1 * | 10/2013 | Gilson ..................... F02K 3/06 60/805 |
| 2015/0129045 A1 | 5/2015 | Kane et al. |

FOREIGN PATENT DOCUMENTS

| | | |
|---|---|---|
| GB | 1490923 A | 11/1977 |
| GB | 2273131 A | 6/1994 |
| WO | 2012116999 A1 | 9/2012 |
| WO | 2014170609 A1 | 10/2014 |

OTHER PUBLICATIONS

HexWeb Acousti-Cap product information, retrieved on Feb. 19, 2014 from website http://www.hexcel.com/Resources/DataSheets/Brochure-Data-Sheets/HexWeb_Acousti-Cap.pdf (4 pgs).

Combined Search and Examination Report, dated Oct. 26, 2015, for co-pending patent application No. GB1506925.5 (5 pgs.).

Search Report for Application No. GB1503044.8, Jul. 17, 2015, 3 pages.

GB Combined Search and Examination Report, dated Jul. 26, 2016 for related application GB1611630.3; 7 pp.

Great Britain Search and Examination Report dated Jul. 26, 2016 for related application GB1611630.3; 7 pp.

Great Britain Office Action for Application No. GB1611630.3, dated Sep. 28, 2016, 4 pages.

* cited by examiner

LIPSKIN FOR A NACELLE AND METHODS OF MAKING THE SAME

BACKGROUND

The field of the disclosure relates generally to engine nacelles, and, more particularly, to a lipskin assembly for an engine nacelle.

At least some known engines, such as some known jet engines and turbofan jet engines, are surrounded by a generally barrel-shaped nacelle. At least some known nacelles include a lipskin that extends in an upstream direction from a first edge to a hilite, that is, a locus of forwardmost points on the lipskin, to define a generally diffuser-shaped inlet of the nacelle. Such known lipskins also extend radially outward and back from the hilite in a downstream direction to a second edge to form at least a portion of a generally aerodynamic radially outer barrel of the nacelle.

At least some known lipskins include at least a portion that is unitarily formed from the first edge, through the hilite, to the second edge. Such unitary forming is customarily used to reduce a need for transverse weld lines or other couplings that may result in a premature transition from natural laminar air flow to turbulent air flow over the outer barrel portion of the lipskin. For example, at least some known lipskins are formed by spin-forming a unitary blank of titanium or 2219 aluminum into an approximate shape of the lipskin, and then performing a series of machining and/or stretch-forming operations on the unitary lipskin until it meets tolerance and surface finish requirements. However, such multi-stage forming is costly and time-consuming. Moreover, stretch-forming of such known unitary lipskins is relatively difficult due to a curvature around the hilite of the lipskin, which may require, for example, a "bull nose" fixture and jaws to perform stretch-forming.

In addition, even after multi-stage forming, such known unitary lipskins may exhibit ripples or waves on the outer barrel portion. Furthermore, for at least some known nacelles, a limit on a size of unitary lipskin assemblies that may be formed from spin-forming results in a need for close-out panels on the outer barrel downstream of the second edge of the lipskin, for example, between the second edge and a fan cowl. Such ripples, waves, and/or close-out panels on the outer barrel tend to cause a premature transition to turbulent air flow over the nacelle, which increases a specific fuel consumption of the engine.

BRIEF DESCRIPTION

In one aspect, a lipskin for a nacelle is provided. The lipskin includes a generally annular first lipskin segment that extends generally upstream from a first lipskin edge to a forward edge. The forward edge is proximate to a hilite of the nacelle. The lipskin also includes a generally annular second lipskin segment that extends generally downstream from the forward edge to a second lipskin edge. The second lipskin segment is oriented generally concentrically about the first lipskin segment. The first lipskin segment and the second lipskin segment are coupled together at the forward edge.

In another aspect, a nacelle for an engine is provided. The nacelle includes a generally annular first lipskin segment that extends generally upstream from a first lipskin edge to a forward edge. The forward edge is proximate to a hilite of the nacelle. The first lipskin segment is configured to contact an internal airflow through the nacelle. The nacelle also includes a generally annular second lipskin segment that extends generally downstream from the forward edge to a second lipskin edge. The second lipskin segment is oriented generally concentrically about the first lipskin segment. The first lipskin segment and the second lipskin segment are coupled together at the forward edge. The second lipskin segment is configured to contact an external airflow past the nacelle.

In another aspect, a method of forming a lipskin is provided. The method includes orienting a generally annular first lipskin segment and a generally annular second lipskin segment generally concentrically, such that the second lipskin segment substantially circumscribes the first lipskin segment. The first lipskin segment extends generally upstream from a first lipskin edge to a forward edge, and the second lipskin segment extends generally downstream from the forward edge to a second lipskin edge. The forward edge is proximate to a hilite of the nacelle. The method also includes coupling the first lipskin segment and the second lipskin segment together at the forward edge.

DETAILED DESCRIPTION

The apparatus and methods described herein provide for a lightweight and efficient engine nacelle that attenuates noise promulgating from the engine while also providing increased structural rigidity. The engine nacelle includes a lipskin assembly comprising a lipskin that includes a first segment and a second segment that are coupled together at a location proximate to a hilite of the nacelle. The second segment extends sufficiently far downstream to reduce or eliminate a need for at least one closeout panel aft of the lipskin. In addition to separately formed first and second segments, the embodiments provide for superplastic, or alternatively non-superplastic, stretch-forming of the first and second segments to facilitate reducing or eliminating ripples and/or waves in the lipskin. As such, the lipskin described herein is configured to reduce or eliminate a premature transition from natural laminar air flow to turbulent air flow as compared to conventional lipskins.

Moreover, the lipskin assembly may include a linear facesheet coupled between an acoustic core and the lipskin. Each of the acoustic core, linear facesheet, and lipskin include a plurality of openings that facilitate channeling heated air therethrough to provide ice prevention measures on the nacelle. The openings in the linear facesheet form a plurality of tortuous paths that facilitate damping the noise generated by the engine within the nacelle. As such, the lipskin itself may not be relied upon to perform noise attenuation, which may allow for openings in the lipskin to be fewer in number and larger than those in other conventional lipskin. More specifically, the lipskin openings can be elongated in a direction of airflow to facilitate an increased percent open area of the lipskin while maintaining structural integrity of the lipskin and reducing excrescence drag. As such, the lipskin assembly facilitates an ease of manufacture of the nacelle by avoiding a time- and cost-intensive lipskin opening formation process.

Furthermore, the engine nacelle may provide for additional noise attenuation using a plurality of generally concentric cores. A thickness of a first of the plurality of cores is not equal to a thickness of a second of the plurality of cores, such that the second core complements a damping provided by first core. Because the first and second cores may not be relied upon to meet structural strength requirements of the nacelle, the cells in the first core generally may not be aligned with the cells in a second core, facilitating an ease of manufacture of the nacelle by avoiding a time- and cost-intensive cell alignment and/or cell-by-cell septumization process. In addition, the apparatus and methods described herein provide a core linear facesheet that is similar to the lipskin described above in that the core linear facesheet includes elongated orifices that facilitate an increased percent open area of the facesheet while maintaining structural integrity of the facesheet and reducing excrescence drag.

The structural rigidity of the nacelle may be provided by a forward bulkheads and an aft bulkhead. Each of the forward and aft bulkheads include a curvilinear body portion that extends from the second segment of the lipskin to one of the first segment of the lipskin or the plurality of cores. The body portions are curved in cross section such that they are able to receive an impact load, from a birdstrike, for example, and transfer that load circumferentially about the circumference of the nacelle. Furthermore, the curvilinear body portion of the aft bulkhead is configured to react to radial loads caused by a fan blade out event. As such, the exemplary engine nacelle eliminates the need for an additional crush zone component to react to the radial load. Moreover, the forward bulkhead is formed from a thermal insulating material such that independent insulating components are not required in the exemplary nacelle. Accordingly, the forward and aft bulkheads facilitate reducing the part count of the engine nacelle and provide for a lighter, less expensive, and more easily serviceable engine nacelle.

Used in combination, the features described above provide for a noise attenuating engine nacelle that is easier to manufacture, more fuel efficient, less expensive, more easily serviceable, and more lightweight than conventional engine nacelles. However, while a preferred implementation of the engine nacelle includes each of the features described above, it is contemplated that any one of such features provides for an improved engine nacelle as compared to known nacelles. As such, the exemplary engine nacelle described herein may have one, all, or any combination of the features described above.

Figure 1:
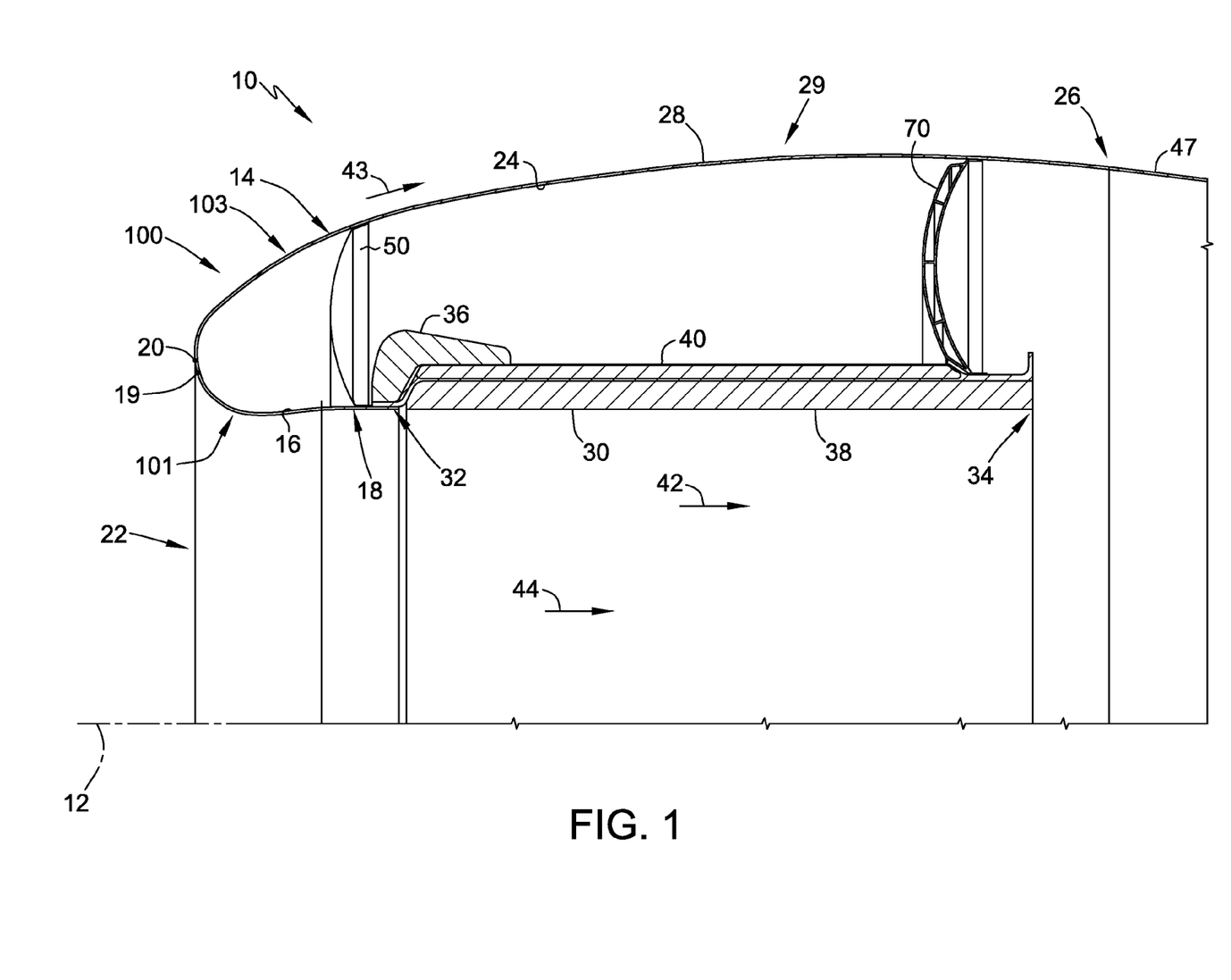
FIG. 1 is a schematic diagram of an embodiment of an engine nacelle.

Referring more particularly to the drawings, implementations of the disclosure may be described in the context of a nacelle 10 shown schematically in cross-section in FIG. 1. In an embodiment, nacelle 10 encloses a turbofan engine for use with an aircraft. It should be understood, however, that the disclosure applies equally to nacelles for other applications.

In the illustrated embodiment, nacelle 10 extends generally circumferentially about a centerline 12. A lipskin assembly 14 includes a first lipskin assembly segment 16 that extends from a first lipskin edge 18 to a forward edge 19 to define a generally diffuser-shaped inlet 22 of nacelle 10. Forward edge 19 is located proximate to a hilite 20 of nacelle 10.

Lipskin assembly 14 further includes a second lipskin assembly segment 24 that extends from forward edge 19 to a second lipskin edge 26 to form at least a portion of a radially outer barrel 28 of nacelle 10. A radially inner barrel 30 extends from a first inner barrel edge 32, proximate to first lipskin edge 18, to a second inner barrel edge 34. Inner barrel 30 includes a radially inner surface 38 and a generally concentric radially outer surface 40. Radially inner surface 38 is disposed proximate to an internal airflow 42 that enters through inlet 22 and flows generally downstream in an axial direction 44 when nacelle 10 is in an operational state.

In the illustrated embodiment, inner barrel 30 is configured to be coupled to first lipskin edge 18 of lipskin assembly 14 through a plurality of circumferentially spaced gusseted brackets 36 that extend from inner barrel 30 proximate a forward edge of backskin 40. In an alternative embodiment, first inner barrel edge 32 is configured to couple to first lipskin edge 18 directly. In other alternative embodiments, inner barrel 30 and lipskin assembly 14 are coupled in any suitable fashion that enables nacelle 10 to function as described herein, such as but not limited to, through a splice plate or flange.

Second lipskin edge 26 is positioned adjacent to an aft portion 47 of nacelle 10. In an embodiment, aft portion 47 is a fan cowl. In alternative embodiment, aft portion 47 is at least one closeout panel. In other alternative embodiments, aft portion 47 may be any suitable portion of nacelle 10.

A generally annular forward bulkhead 50 extends radially between first lipskin assembly segment 16 and second lipskin assembly segment 24. In the illustrated embodiment, forward bulkhead 50 extends from first lipskin assembly segment 16 generally proximate to first lipskin edge 18 and first inner barrel edge 32. In addition, a generally annular aft bulkhead 70 extends radially between inner barrel 30 and second lipskin assembly segment 24. In the illustrated embodiment, aft bulkhead 70 extends from inner barrel 30 generally proximate to second inner barrel edge 34, and more specifically, from inner barrel 30 proximate an aft edge of backskin 40. In alternative embodiments, forward bulkhead 50 and aft bulkhead 70 are disposed in any suitable position that enables nacelle 10 to function as described herein.

Lipskin assembly 14 includes a lipskin 100. A first lipskin segment 101 of lipskin 100 is configured to be the radially innermost layer of first lipskin assembly segment 16, with respect to centerline 12, such that first lipskin segment 101 is in contact with internal airflow 42 when nacelle 10 is in an operational state. A second lipskin segment 103 of lipskin 100 is configured to be the radially outermost layer of second lipskin assembly segment 24, with respect to centerline 12, such that second lipskin segment 103 is in contact with an external airflow 43 around nacelle 10. In certain embodiments, first lipskin segment 101 and second lipskin segment 103 are formed separately and coupled together at forward edge 19 proximate to hilite 20 to make lipskin 100.

Figure 2:
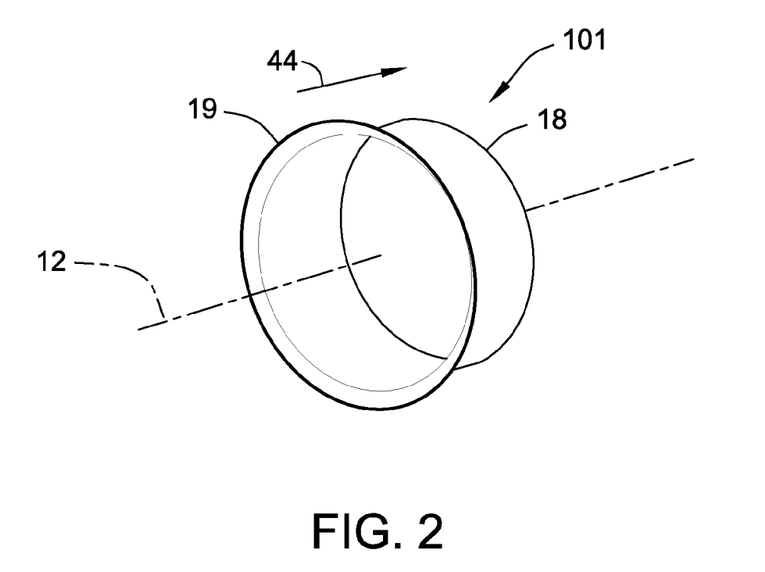
FIG. 2 is a schematic perspective view of an embodiment of a first lipskin segment that may be used with the engine nacelle shown in FIG. 1.

FIG. 2 is a schematic perspective view of an embodiment of first lipskin segment 101. In the illustrated embodiment, first lipskin segment 101 has a generally diffuser shape that extends generally upstream along axial direction 44 from first lipskin edge 18 to forward edge 19. In certain embodiments, first lipskin segment 101 is superplastic-formed, that is, a material used to form first lipskin segment 101 is heated to a superplastic state and stretch-formed into a desired shape. In some embodiments, superplastic forming facilitates forming first lipskin segment 101 with an increase in precision and a decrease in waves and ripples, relative to spin-forming. In alternative embodiments, the material used to form first lipskin segment 101 is stretch-formed while in a non-superplastic state.

Figure 3:
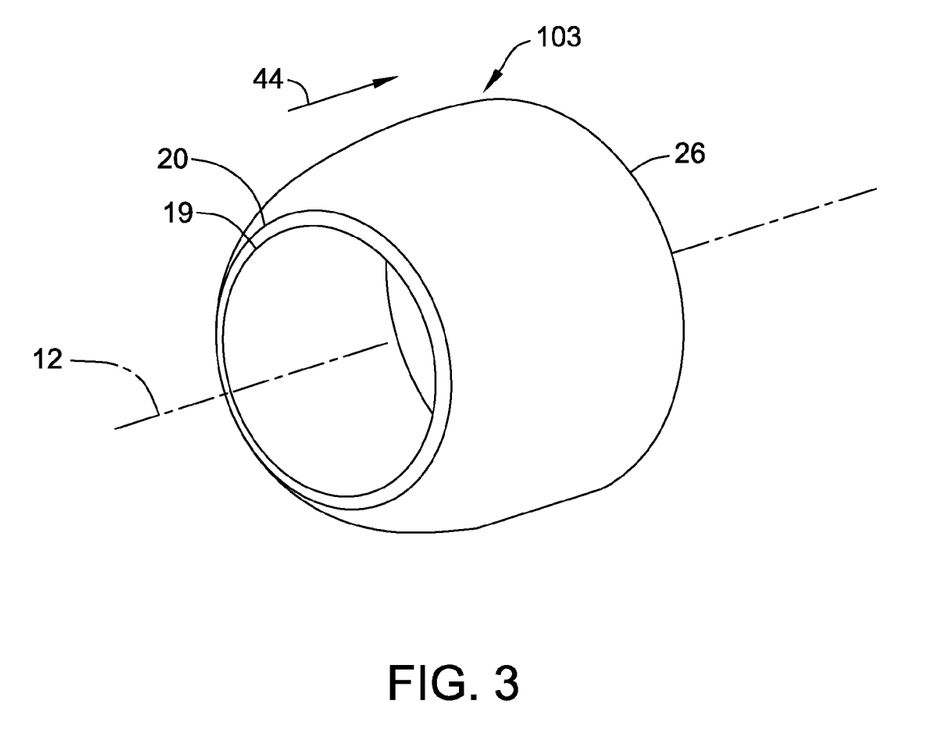
FIG. 3 is a schematic perspective view of an embodiment of a second lipskin segment that may be used with the engine nacelle shown in FIG. 1.

FIG. 3 is a schematic perspective view of an embodiment of second lipskin segment 103. In the illustrated embodiment, second lipskin segment 103 has a generally aerodynamic shape that extends generally downstream along axial direction 44 from forward edge 19 to second lipskin edge 26. Also in the illustrated embodiment, second lipskin segment 103 is sized to extend sufficiently far downstream along axial direction 44 such that second lipskin edge 26 is positioned adjacent to a desired aft portion 47 (shown in FIG. 1) of nacelle 10. For example, second lipskin segment 103 is sized to extend downstream along axial direction 44 such that aft portion 47 is a fan cowl positioned adjacent to second lipskin edge 26, thereby reducing or eliminating a need for at least one closeout panel aft of lipskin 100 between lipskin 100 and the fan cowl. Moreover, forming second lipskin segment 103 separately from first lipskin segment 101 avoids a need for a portion of second lipskin segment 103 to extend axially inboard along inlet 22, and thus correspondingly facilitates extending second lipskin segment 103 farther downstream along the outer barrel of nacelle 10 while reducing or eliminating ripples and/or waves in the downstream portion, as compared to known lipskins.

In certain embodiments, second lipskin segment 103 is superplastic-formed. In some embodiments, superplastic forming facilitates forming second lipskin segment 103 with an increase in precision and a decrease in waves and ripples, relative to spin-forming. In alternative embodiments, a material used to form second lipskin segment 103 is stretch-formed while in a non-superplastic state.

With reference to FIGS. 1-3, in certain embodiments, at least one of first lipskin segment 101 and second lipskin segment 103 is formed from an aluminum alloy including magnesium and scandium, such as 5024 aluminum. In an embodiment, forming first lipskin segment 101 and second lipskin segment 103 from 5024 aluminum results in a five percent weight reduction as compared to forming a substantially identical lipskin using 2219 aluminum. Additionally or alternatively, forming first lipskin segment 101 and second lipskin segment 103 from 5024 aluminum results in a decrease in thermal creep induced by an anti-icing system in nacelle 10, as compared to a substantially identical lipskin formed from 2219 aluminum. In alternative embodiments, each of first lipskin segment 101 and second lipskin segment 103 is formed from 2219 aluminum. In other alternative embodiments, each of first lipskin segment 101 and second lipskin segment 103 is formed from any material that enables first lipskin segment 101 and second lipskin segment 103, respectively, to function as described herein.

Moreover, in some embodiments, a tooling required to stretch-form at least one of first lipskin segment 101 and second lipskin segment 103 while in one of a superplastic state and a non-superplastic state is relatively less expensive and easier to use than comparable equipment for stretch-forming a conventional lipskin, because of a reduced complexity of the generally annular shapes of first lipskin segment 101 and second lipskin segment 103, respectively, as compared to a conventional lipskin. In an embodiment, a first tool (not shown) used to form first lipskin segment 101 is constructed as a match-tool set with a second tool (not shown) used to form second lipskin segment 103, that is, the first tool and the second tool are formed together and then separated to facilitate matched sizing of first lipskin segment 101, formed using the first tool, and second lipskin segment 103, formed using the second tool.

Figure 4:
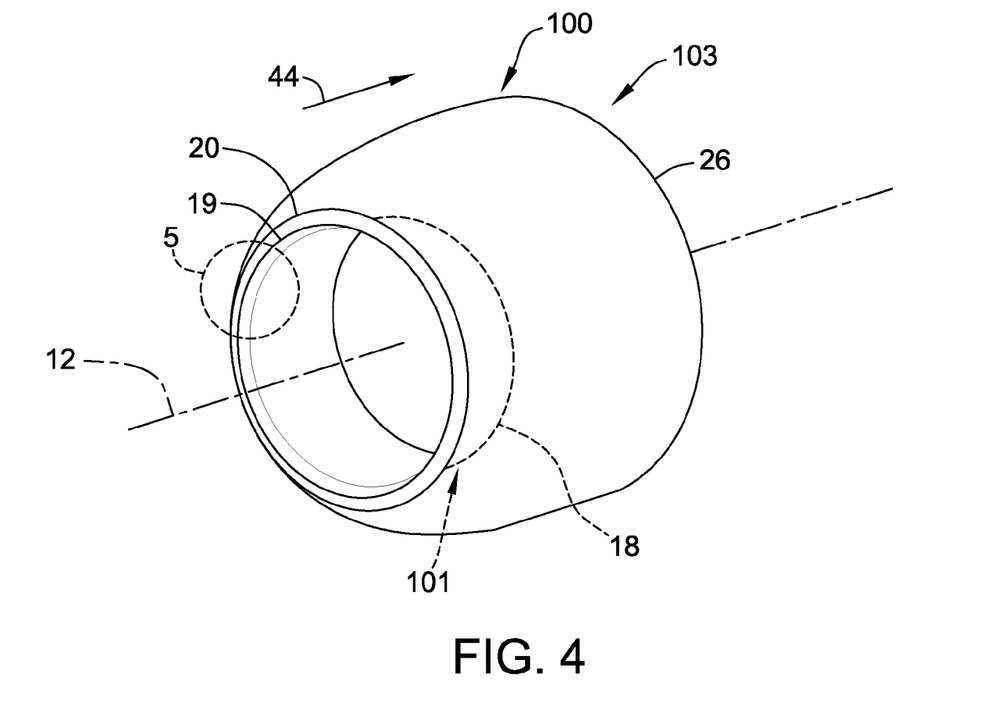
FIG. 4 is a schematic perspective view of the first lipskin segment of FIG. 2 coupled to the second lipskin segment of FIG. 3 to form a lipskin that may be used with the engine nacelle shown in FIG. 1.

FIG. 4 is a schematic perspective view of first lipskin segment 101 coupled to second lipskin segment 103 to form an embodiment of lipskin 100. In the illustrated embodiment, first lipskin segment 101 and second lipskin segment 103 are oriented generally concentrically about centerline 12, such that second lipskin segment 103 substantially circumscribes first lipskin segment 101. First lipskin segment 101 and second lipskin segment 103 are coupled together at forward edge 19 proximate to hilite 20.

Figure 5:
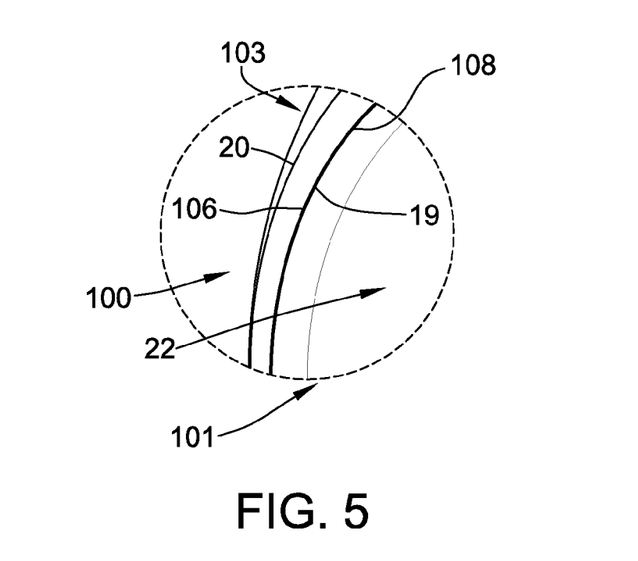
FIG. 5 is an enlarged view of a portion of the lipskin shown in FIG. 4.

A portion 5 of lipskin 100 shown in FIG. 4 is illustrated in an enlarged view in FIG. 5. In the embodiment illustrated in FIG. 5, a weld 106 extends circumferentially and coincidently with forward edge 19 to couple first lipskin segment 101 and second lipskin segment 103. In certain embodiments, weld 106 is formed by friction-stir welding to facilitate a clean weld that produces a minimal aerodynamic effect when nacelle 10 is in operation. In alternative embodiments, weld 106 is formed by another suitable welding method. In still other alternative embodiments, first lipskin segment 101 and second lipskin segment 103 are coupled together at forward edge 19 in any suitable fashion that enables lipskin 100 to function as described herein.

In the illustrated embodiment, forward edge 19 is coincident with a circumferential locus of stagnation points 108 defined for inlet 22 at a target operating condition for nacelle 10. Thus, weld 106 extends circumferentially and coincidently with the locus of stagnation points 108 to couple first lipskin segment 101 and second lipskin segment 103. Co-locating weld 106 with the locus of stagnation points 108 facilitates minimizing an aerodynamic effect of weld 106 when nacelle 10 is in the target operating condition. In alternative embodiments (not shown), forward edge 19 is selected to be any location proximate to hilite 20 that enables lipskin 100 to be formed as described herein. In an embodiment (not shown), forward edge 19 is coincident with hilite 20, such that first lipskin segment 101 and second lipskin segment 103 are coupled together at hilite 20. It should be understood that in some embodiments and for some target operating conditions, the locus of stagnation points 108 may be at least partially coincident with hilite 20.

Figure 6:
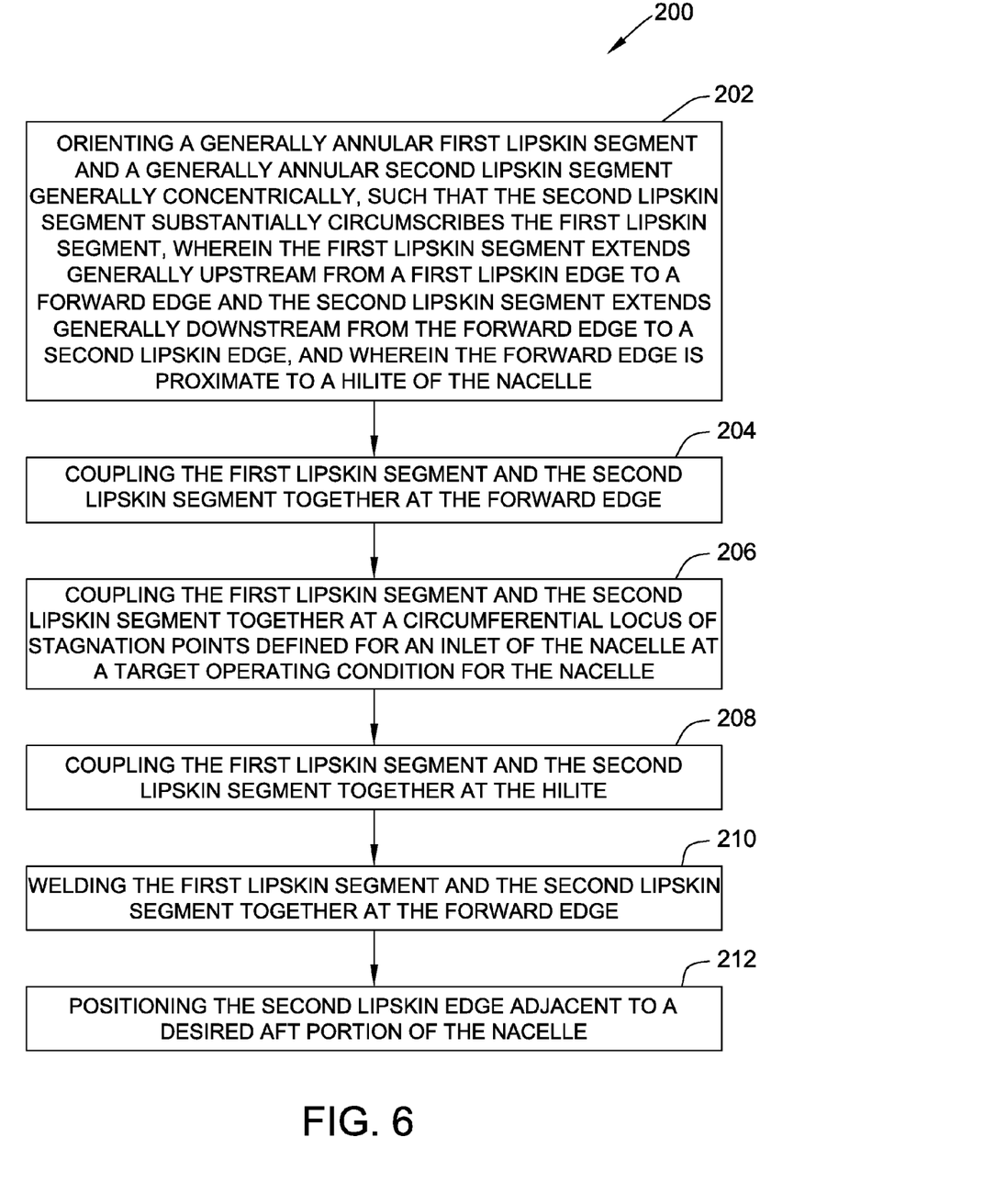
FIG. 6 is a flowchart of an embodiment of a method of making a lipskin that may be used with the engine nacelle shown in FIG. 1.

FIG. 6 is a flowchart of an embodiment of a method 200 of making a lipskin, such as lipskin 100, for a nacelle, such as nacelle 10. Method 200 includes orienting 202 a generally annular first lipskin segment, such as first lipskin segment 101, and a generally annular second lipskin segment, such as second lipskin segment 103, generally concentrically, such that the second lipskin segment substantially circumscribes the first lipskin segment. The first lipskin segment extends generally upstream from a first lipskin edge, such as first lipskin edge 18, to a forward edge, such as forward edge 19. The second lipskin segment extends generally downstream from the forward edge to a second lipskin edge, such as second lipskin edge 26. The forward edge is proximate to a hilite of the nacelle, such as hilite 20. Method 200 also includes coupling 204 the first lipskin segment and the second lipskin segment together at the forward edge.

In certain embodiments, said coupling 204 the first lipskin segment and the second lipskin segment together at the forward edge comprises coupling 206 the first lipskin segment and the second lipskin segment together at a circumferential locus of stagnation points defined for an inlet of the nacelle at a target operating condition for the nacelle, such as locus of stagnation points 108. Alternatively or additionally, said coupling 204 the first lipskin segment and the second lipskin segment together at the forward edge comprises coupling 208 the first lipskin segment and the second lipskin segment together at the hilite. Alternatively or additionally, said coupling 204 the first lipskin segment and the second lipskin segment together at the forward edge comprises welding 210 the first lipskin segment and the second lipskin segment together at the forward edge. In some embodiments, method 200 further includes positioning 212 the second lipskin edge adjacent to a desired aft portion of the nacelle, such as aft portion 47, which may be a fan cowl of the nacelle.

Each of the processes of method 200 may be performed or carried out by a system integrator, a third party, and/or a customer. For the purposes of this description, a system integrator may include without limitation any number of aircraft manufacturers and major-system subcontractors; a third party may include without limitation any number of venders, subcontractors, and suppliers; and a customer may be an airline, leasing company, military entity, service organization, and so on. Moreover, although an aerospace example is shown, the principles of the invention may be applied to other industries, such as the automotive industry.

The embodiments described herein provide a lipskin and method of making a lipskin for an engine nacelle. The embodiments provide a first lipskin segment and a second lipskin segment coupled together at a location proximate to a hilite of the nacelle. Moreover, the second lipskin segment is sized to extend sufficiently far downstream to reduce or eliminate a need for at least one closeout panel aft of the lipskin. The embodiments provide for superplastic, or alternatively non-superplastic, stretch-forming of the lipskin segments to facilitate reducing or eliminating ripples and/or waves in the lipskin. In addition, forming the second lipskin segment separately from the first lipskin segment facilitates reducing or eliminating ripples and/or waves in the outer barrel portion. Contrary to knowledge in the art, which teaches that to avoid a premature transition from natural laminar air flow to turbulent air flow, a lipskin should include at least a portion that is unitarily formed to extend from a first edge, along an upstream direction to the hilite, and radially outward and back from the hilite in a downstream direction to a second edge, the embodiments described herein unexpectedly reduce or eliminate a premature transition from natural laminar air flow to turbulent air flow.

The embodiments described herein provide improvements over at least some known lipskins for engine nacelles. As compared to at least some known lipskins, the embodiments described herein facilitate avoiding a premature transition from natural laminar air flow to turbulent air flow around the nacelle by reducing or eliminating ripples, waves, and/or close-out panels on the outer barrel portion of the lipskin. In addition, the embodiments described herein facilitate an ease of manufacture of the lipskin by avoiding a time- and cost-intensive multistage spin-forming and machining process, and by facilitating a use of less complex and less costly tools for superplastic or non-superplastic stretch-forming.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A lipskin for a nacelle, said lipskin comprising:
  a first lipskin segment that extends from a first lipskin edge to a forward edge, wherein said forward edge is proximate to a circumferential locus of stagnation points defined for an inlet of the nacelle at a target inlet air flow operating condition for the nacelle; and
  a second lipskin segment that extends from said forward edge to a second lipskin edge, said second lipskin segment substantially circumscribes said first lipskin segment, wherein said first lipskin segment and said second lipskin segment are separately formed and coupled together at said forward edge.

2. The lipskin according to claim 1, wherein said forward edge is coincident with the circumferential locus of stagnation points.

3. The lipskin according to claim 1, wherein said forward edge is coincident with a hilite.

4. The lipskin according to claim 1, wherein said first lipskin segment and said second lipskin segment are coupled together by a weld.

5. The lipskin according to claim 4, wherein said weld is a friction-stir weld.

6. The lipskin according to claim 1, wherein said first lipskin segment is configured to define a generally diffuser-shaped inlet of the nacelle.

7. The lipskin according to claim 1, wherein said first lipskin edge is configured to couple to an inner barrel of the nacelle.

8. The lipskin according to claim 1, wherein said second lipskin segment is sized to extend downstream such that said second lipskin edge is configured for positioning adjacent to a desired aft portion of the nacelle.

9. A nacelle for an engine, said nacelle comprising:
  a first lipskin segment that extends from a first lipskin edge to a forward edge, wherein said forward edge is proximate to a circumferential locus of stagnation points defined for an inlet of said nacelle at a target inlet air flow operating condition for said nacelle, said first lipskin segment configured to contact an internal airflow through said nacelle; and
  a second lipskin segment that extends from said forward edge to a second lipskin edge, said second lipskin segment substantially circumscribes said first lipskin segment, wherein said first lipskin segment and said second lipskin segment are separately formed and coupled together at said forward edge, said second lipskin segment configured to contact an external airflow over said nacelle.

10. The nacelle according to claim 9, wherein said forward edge is coincident with the circumferential locus of stagnation points.

11. The nacelle according to claim 9, wherein said forward edge is coincident with a hilite.

12. The nacelle according to claim 9, wherein said first lipskin segment and said second lipskin segment are coupled together by a weld.

13. The nacelle according to claim 12, wherein said weld is a friction-stir weld.

14. The nacelle according to claim 9, wherein said first lipskin segment defines a generally diffuser-shaped inlet of said nacelle.

15. The nacelle according to claim 9, wherein said second lipskin edge is positioned adjacent to a fan cowl of said nacelle.

16. A method of making a lipskin for a nacelle, said method comprising:
orienting a first lipskin segment and a separately formed second lipskin segment such that the second lipskin segment substantially circumscribes the first lipskin segment, wherein the first lipskin segment extends from a first lipskin edge to a forward edge and the second lipskin segment extends from the forward edge to a second lipskin edge, and wherein the forward edge is proximate to a circumferential locus of stagnation points defined for an inlet of the nacelle at a target inlet air flow operating condition for the nacelle; and
coupling the first lipskin segment and the second lipskin segment together at the forward edge.

17. The method according to claim 16, wherein said orienting the first lipskin segment and the second lipskin segment comprises orienting the first lipskin segment and the second lipskin segment such that the forward edge is coincident with the circumferential locus of stagnation points.

18. The method according to claim 16, wherein said coupling the first lipskin segment and the second lipskin segment together at the forward edge comprises coupling the first lipskin segment and the second lipskin segment together at a hilite.

19. The method according to claim 16, wherein said coupling the first lipskin segment and the second lipskin segment together at the forward edge comprises welding the first lipskin segment and the second lipskin segment together at the forward edge.

20. The method according to claim 16, further comprising positioning the second lipskin edge adjacent to a fan cowl of the nacelle.

* * * * *